United States Patent
Rifkin

(10) Patent No.: US 7,160,565 B2
(45) Date of Patent: Jan. 9, 2007

(54) HYDRATION BEVERAGE AND METHOD OF DELIVERING NUTRIENTS

(75) Inventor: Cal Rifkin, Staten Island, NY (US)

(73) Assignee: Breakthru Products, LLC, New York, NY (US)

( * ) Notice: Subject to any disclaimer, the term of this patent is extended or adjusted under 35 U.S.C. 154(b) by 125 days.

(21) Appl. No.: 10/403,429

(22) Filed: Mar. 31, 2003

(65) Prior Publication Data

US 2004/0191388 A1    Sep. 30, 2004

(51) Int. Cl.
A23L 1/304    (2006.01)
A23L 2/52    (2006.01)

(52) U.S. Cl. .................. 426/72; 426/74; 426/590; 426/615; 426/640; 426/656

(58) Field of Classification Search ............... 426/656, 426/72, 74, 615, 640, 590
See application file for complete search history.

(56) References Cited

U.S. PATENT DOCUMENTS

| | | |
|---|---|---|
| 4,042,684 A | 8/1977 | Kahm |
| 4,093,750 A | 6/1978 | Babayan |
| 4,312,856 A | 1/1982 | Korduner et al. |
| 4,593,020 A | 6/1986 | Guinot |
| 4,703,045 A | 10/1987 | Guinot |
| 4,853,237 A | 8/1989 | Prinkkila et al. |
| 5,032,411 A | 7/1991 | Stray-Gundersen |
| 5,089,477 A | 2/1992 | Fregly et al. |
| 5,114,723 A | 5/1992 | Stray-Gundersen |
| 5,147,650 A | 9/1992 | Fregly et al. |
| 5,236,712 A | 8/1993 | Fregly et al. |
| 5,292,729 A | 3/1994 | Ashmead |
| 5,397,786 A * | 3/1995 | Simone .................. 514/300 |
| 5,536,506 A * | 7/1996 | Majeed et al. ............. 424/464 |
| 5,614,207 A | 3/1997 | Shah et al. |
| 5,681,569 A | 10/1997 | Kuznicki et al. |
| 5,744,161 A | 4/1998 | Majeed et al. |
| 5,891,888 A | 4/1999 | Strahl |
| 5,972,382 A | 10/1999 | Majeed et al. |
| 6,054,585 A | 4/2000 | Majeed et al. |
| 6,114,379 A * | 9/2000 | Wheelwright et al. ....... 514/492 |
| 6,156,293 A | 12/2000 | Jutila et al. |
| 6,296,892 B1 | 10/2001 | Elseviers et al. |
| 6,485,764 B1 | 11/2002 | Robergs et al. |
| 2003/0091615 A1* | 5/2003 | Craig .................... 424/439 |
| 2003/0104107 A1* | 6/2003 | Gillota ................... 426/590 |

OTHER PUBLICATIONS

Soderling, E.; Le Bell A.; Kirstila, V.; Tenovuo, J., "Betaine-containing toothpaste relieves subjective symptoms of dry mouth", Feb. 27, 2003, pp. 4-5, http://www.bulkmsm.com/TMG/tmg7.htm.
Healthwell, "Betaine (Trimethylglycine)", Feb. 20, 2003, pp. 1-4, http://www.healthwell.com/healthnotes/Supp/Betaine.cfm.
Bio-Probe Inc., Bio-Probe News, "Help for Dry Mouth", Feb. 27, 2003, pp. 1-4, http://www.bioprobe.com/ReadNews.asp?article+18.
"Betaine", Feb. 20, 2003, pp. 1-4, http://www.healthandage.com/html/res/com/ConsSupplements/Betainecs.html.
iHerb.Com, "Triple-Boost (Triple Boost), Irwin Naturals, 75 Liquid Gel Caps." Feb. 20, 2003, pp. 1-3, http://store.yahoo.com/iherb/tripleboost.html.
George S. Kelly, N.D., "Sports Nutrition: A Review of Selected Nutritional Supplements For Endurance Athletes", Mar. 5, 2003, pp. 1-19, http://www.thorne.com/altmedrev/fulltext/sports2-4.html.

* cited by examiner

Primary Examiner—Helen Pratt
(74) Attorney, Agent, or Firm—Stroock & Stroock & Lavan LLP

(57) ABSTRACT

A composition useful as a hydrating beverage comprising at least one complex carbohydrate, at least one chelated electrolyte, betaine, and piperine. The composition, which may be carbonated or non-carbonated beverage compositions and beverage concentrates adapted for all administration of water, physiologically essential electrolytes and other ingredients to a subject specifically adapted for enhancing hydration; preferably with enhanced absorption after ingestion while at the same time attenuating muscle fatigue and, preferably destroying harmful free radicals.

25 Claims, No Drawings

HYDRATION BEVERAGE AND METHOD OF DELIVERING NUTRIENTS

BACKGROUND OF INVENTION

1. Field of the Invention

The present invention relates to a new liquid composition for improved digestion of carbohydrates which comprises certain amino acid chelates that stimulate and enhance enzymatic carbohydrase activity, and the use of this composition as a rehydration drink. More precisely, the present invention relates to carbonated or non-carbonated beverage compositions and beverage concentrates adapted for oral administration of water, physiologically essential electrolytes and other ingredients to a subject specifically adapted for enhancing hydration; preferably with enhanced absorption after ingestion while at the same time attenuating muscle fatigue and, preferably, destroying harmful free radicals.

2. Description of the Related Art

In formulating a diet there are six basic nutrients generally taken into account: carbohydrates, proteins, fats, vitamins, minerals and water. These six nutrients function to provide a source of energy for growth and maintenance of body tissue, to regulate body process. The provision of energy is the predominant role and must be satisfied at the expense of the other nutritive roles if there are insufficient nutrients to accomplish all three functions.

Carbohydrates provide a source of energy. Although energy can also be obtained from fats and proteins, carbohydrates are generally the major source of energy in the diets of man and animals. A certain amount of ingested carbohydrates remains undigested. The potential energy value of that undigested carbohydrate is lost to the animal. Additionally, there is a considerable loss of energy which occurs in the various necessary processes of chewing, digesting, and assimilating the food. Furthermore, if digestion is inefficient, more potential energy will be lost in the digestion process than is necessary. Inefficient digestion of carbohydrates results in greater expense because more carbohydrates must be consumed to meet the energy needs, or in the alternative, the animal must ingest more dietary fats or proteins which are more expensive sources of energy. With growing animals or children it is not desirable to remove body stores of fat or protein to meet energy needs. Any improvement which can be made in the efficiency of digestion of the carbohydrates, which is a major energy source in foods, is of real economic and nutritional importance. Thus it would be beneficial to the recipient host to improve the digestion coefficient and net energy values of carbohydrates by improving their digestibility.

Physical activity, such as exercise and heavy work, particularly in the heat, places a great metabolic demand on the human body. During exercise sweat is lost from the body, which can produce a state of dehydration. Dehydration is associated with a reduction in plasma volume. Also associated with dehydration is an impairment of body heat dissipation and endurance performance. In addition, physical activity places a demand on the body's carbohydrate stores such as muscle glycogen, liver glycogen and plasma glucose. Loss of water, redistribution and loss of electrolytes, and the depletion of endogenous carbohydrate stores are primary causes of fatigue which impairs one's work capacity. To maintain the body's physical capabilities, it is essential that water, electrolytes, carbohydrate and other nutrients are provided in a timely and appropriate fashion. Fluid replacement during physical activity has been shown to be effective in preventing dehydration and hypothermia. Various illnesses and operations often cause a state of hypohydration. In such cases, fluid replacement is also essential during illness and post-operative recovery.

In the last decade the use of liquid drinks containing carbohydrates during exercise has become increasingly accepted as a stimulus during endurance performance. As a result, it is general practice to ingest substantial amounts of carbohydrate in a liquid form during endurance competition events. Supplementation with carbohydrate containing fluids is employed to prolong exercise and improve the performance of high intensity endurance exercise.

Carbohydrate containing drinks raise blood sugar concentration, and therefore increase plasma insulin levels. This in turn causes readjustment of the metabolism of the liver in a glycogen-saving direction. Insulin drives glucose out of the blood and into the cells. If the rise in blood sugar is rapid, it provides a large release of insulin, which drives the blood sugar level lower than it was to start with. Different carbohydrates have different abilities to stimulate insulin secretion.

There are a number of liquid compositions or diluted mixtures marketed as "activity drinks," "sports drinks," "energy drinks" or "nutrient drinks". These drinks are reported to solve problems with respect to the loss of carbohydrates, electrolytes, vitamins, minerals, amino acids, and other important nutrients that occurs during exercise. Examples of such drinks are disclosed in U.S. Patent Nos. 4,042,684; 4,093,750; 4,312,856; 4,853,237; 5,032,411; 5,397,786; 5,891,888 and 6,296,892.

To enhance endurance, performance and/or recovery, commercial fluid replacement drinks often contain a simple carbohydrate such as glucose or fructose, as a supplementary energy source. Unfortunately, there is a trade-off between the goal of rapid fluid replacement and the goal of energy supplementation when a person consumes a carbohydrate containing drink. As the carbohydrate concentration of a drink increases, the rate of fluid replacement to the body is decreased. Such a result prohibits replacement of the body's stores of carbohydrates, which can be used to overcome fatigue.

To maintain the body's physical capabilities, it is essential that water, electrolytes, carbohydrates, as well as other nutrients be provided in a timely and useful manner. Fluid replacement during physical activity has been shown to be an effective way of preventing dehydration and allowing for top physical performance. The use of electrolytes alone or in conjunction with carbohydrates and water was originally used for hydration. It has been found that the use of chelated electrolytes therewith provided superior hydrating effects. Of significance is the fact that the present invention prevents dehydration.

The functionality of alkaline mass in the body has been of great interest since the early $20^{th}$ century. Extensive research has recently revealed that alkaline mass in the body increases ionization ratios of potassium and sodium to heighten the purification capability of blood, resulting in blood clearance, improved oxygen transport, fatigue-reduction, and aging retardation. The prior art compositions fail to address the problem of muscle fatigue because the mineral, cellular hydration level, and level of potassium and or magnesium previously used do not address the attenuation of such muscle fatigue.

Potassium and magnesium are known to play a major role in overcoming the effects of muscle fatigue. Substantial amounts of potassium and magnesium are lost from the contracting muscles during exercise and there is a rapid decrease in plasma potassium after the cessation of exercise. A low extracellular potassium concentration can cause muscular weakness, changes in cardiac and kidney function, lethargy, and even coma in severe cases. There are no reserves of potassium or sodium in the animal body and any loss beyond the amount of intake comes from the functional supply of body cells and tissues. The kidney is the key regulator of potassium and sodium and while the kidney can, with a low intake of sodium, reduce excretion thereof to a very low level to conserve the supply in the body, potassium is not so efficiently conserved. Present hydrating fluids and beverages contain low levels of potassium and magnesium, and they fail to provide a level of potassium and magnesium sufficient to maintain an adequate blood plasma level of potassium to combat muscle fatigue. Specifically, it has been found that a blood plasma between 4 to 4.5 mEq/L, and potassium excretion in the urine during exercise recovery is desirable to ensure maximize performance and recovery (Textbook of Medical Physiology, 10$^{th}$ Ed. (Aug. 15, 2000) p.336)). Piperine, or mixtures containing piperine, have been shown to increase the bioavailability, blood levels and efficacy of a number of drugs including ingredients of vasaka leaves (Bose, K. G., (1928) Pharmacopeia India, Bose Laboratories, Calcutta), vasicine, sparteine, sulfadiazine (Atal et al., Journal of Ethnopharmacology, 4, 229–233 (1981)), rifampicin (Zutshi, U. et al. (1984) Journal of the Association of Physicians of India, 33, 223–224), phenytoin (Bano et al., Planta Medica, 1987, pp. 568–569), pentobarbitone (Majumdar, A. N. et al. (1990), Indian Journal of Experimental Biology, 28, 486–487), theophylline and propranolol (Bano et al., Eur. J. Clin. Pharmacol. (1991) 41:615–617).

Betaine is a metabolite of choline and is also known as Trimethylglycine or TMG. Betaine works by donating methyl groups. Many important biochmical processes (for example, proper liver function, cellular replication, and detoxification reactions) rely on methylation, therefore, supplementation has interesting potential health benefits. Betaine is a nutrient that plays a role in the health of the cardiovascular system. Betaine, along with other nutrients, helps to reduce potentially toxic levels of homocysteine (Hcy). A naturally occurring amino acid that can be harmful to blood vessels thereby contributing to the development of heart disease, stroke, and peripheral vascular disease. Betaine functions closely with other nutrients to break down homocysteine. Betaine also increases the concentration of acids in the stomach. Additionally, betaine has been found to reduce skin-irritating effects of cosmetics such as sodium lauryl sulfate. Betaine containing toothpaste has been shown to relieve the symptoms of dry mouth. (Soderling, E., et al., "Betaine-containing toothpaste relieves subjective symptoms of dry mouth," Acta Odontol Scand, 1998; 56:65–9) Dietary sources of betaine include beets, fish, legumes, broccoli, and spinach.

While generally satisfactory, all of the prior art electrolyte containing solutions and beverages are not totally effective for a variety of reasons. The existing electrolyte containing rehydrating fluids and beverages are deficient in that they fail to ameliorate the harmful effects of the large amounts of free radicals generated during exercise. Further, such existing fluids and beverages do not have any mechanism of enhanced absorption during exercise, so as to maximize its hydrating properties during exercise recovery. None of the prior art references teaches applicant's unique combination of ingredients to produce applicant's disclosed beneficial results.

SUMMARY OF THE INVENTION

The present invention relates to hydrating beverages and a method for enhancing hydration; preferably with enhanced absorption after ingestion while at the same time attenuating muscle fatigue and, preferably, destroying harmful free radicals. The present invention is applicable to the rehydration of animals including human beings at rest, during exercise, and after exercise/dehydration. The present invention also provides a method for replacing water and carbohydrates lost by perspiration and for preventing a decrease in the glucose content of blood during periods of heavy muscle work The invention also comprises a process for preparing the beverage product.

It is an object of the present invention to provide a beverage composition that can be administered to a subject to prevent dehydration, loss of electrolytes, and nutrient minerals during periods of activity. It is also an object of the present invention to provide a beverage composition that contains an antioxidant. Further, it is an object of the present invention to provide a beverage composition that contains essential physiological electrolytes.

The beverages and methods of the instant invention are ideally suited to anyone exposed to above-normal heat or hydration stress, such as those living in hot or humid climates, factory workers, armed forces personnel, police, firemen, airline workers & passengers and the like, in addition to those who engage in exercise.

DETAILED DESCRIPTION OF THE PREFERRED EMBODIMENTS

The present invention relates to a new composition that provides improved digestion of carbohydrates through the use of an amino acid chelate to stimulate and enhance enzymatic carbohydrase activity. The present invention relates to carbonated and non-carbonated beverage compositions and beverage concentrates adapted for oral administration of water, physiologically essential electrolytes and other ingredients specifically adapted for enhancing hydration. Optionally, sweetening agents, antioxidants to destroy free radicals generated during exercise, and certain amino acids that supply protein for the recovery period are also included in the composition.

Potassium addresses the issue of attenuation of muscle fatigue due to exercise and prevention of a post-exercise rapid fall in blood potassium levels. A potassium amount between 4 to 4.5 mEq/L in the beverage is preferred, however potassium levels as high as 6 mEq/L and higher can be used. Such higher levels may be contraindicated with certain individuals who have certain kidney and adrenal gland disorders, hypertension, and certain heart disorders such as frequently occurring abnormal heart rhythms. Suitable sources of potassium include, but are not limited to, edible salts such as chloride, sorbate, citrate, and the like and mixtures thereof, particularly with a potassium aspartate as discussed below.

Certain edible water-soluble chelated electrolytes improve results before, during, and after exercise from the dehydrating and muscle fatigue problems of exercise. The advantages of these salts is that the chelate aspartate thereof becomes available promptly upon ingestion of the beverage. This results in a higher absorption of potassium into the blood stream allowing for improved hydration and an enhanced recovery period. An additional advantage of using the aspartate form is that it provides phosphate ion which is beneficial in rehydration, as well as supporting muscle metabolism during exercise.

In a preferred embodiment, the composition of the present invention comprises chelated electrolytes. Examples of suitable chelated electrolytes include, but are not limited to, potassium aspartate and magnesium aspartate. When these chelate aspartates are used, the amounts utilized are those which will supply a portion of the alkali metal, preferably potassium, within the ranges set forth above (a blood plasma level between 4 to 4.5 mEq/L and excretion of potassium in the urine).

In order to enhance the flow of saliva, an acidulent is employed in the beverage. Suitable acidulents include, but are not limited to, betaine hydrochloride, betaine citrate, tartaric acid, citric acid, fumaric acid, malic acid, ascorbic acid, phosphoric acid and mixtures thereof. In a preferred embodiment the composition of the present invention comprises betaine. Betaine amount from about 15 to about 100 mg/L is preferable.

The composition of the present invention may also include piperine. Suitable forms of piperine include, but are not limited to, synthetically made piperine extract from black pepper, extract from piper longum, and Bioperine®. Bioperine® is commercially available from Sabinsa Corporation located in Piscataway, N.J.

Another result of exercise is the greatly increased production of destructive free radicals. To negate such harmful effects it is preferred to include at least one edible antioxidant in the composition which will react readily with the free radicals and destroy them before they can damage the body. Suitable antioxidants include, but are not limited to, vitamins Ester-C, vitamin E, selenium, coenzyme Q 10, pycnogenol, L-glutathione, superoxide dismutase, bioflavonoids, pine bark grape seed complex, selenium, zinc, and antioxidants found in plants such as garlic. Of these, vitamin Ester-C is preferred because it has the additional benefit of acting as a buffer in the beverages, thereby combating acidosis. The amounts of antioxidant used can vary widely, but care must be taken to ensure that the amount of antioxidant used does not adversely affect the taste of the beverage.

Sodium can be used at levels conventionally utilized in rehydrating fluids and beverages, i.e., about 20 mEq/L and higher; although the higher levels may cause the beverage to taste too "salty" to the consumer. A preferred level is about 15 to 20 mEq/L . Any of the sodium salts commonly used in rehydrating fluids can be used. Suitable examples include, but are not limited to, sodium chloride, sodium citrate, sodium benzoate, other sodium salts and mixtures thereof.

The composition of the present invention can also include vitamins, minerals and amino acids. Suitable vitamins include, but are not limited to, vitamin B1, vitamin B2, niacinamide, vitamin B6, vitamin B12, folic acid, vitamin C, and vitamin E. Suitable minerals include, but are not limited to calcium, iron, zinc, vanadium, selenium, chromium, boron, potassium, manganese, copper and magnesium. Suitable amino acids include, but are not limited to, lysine, isoleucine, leucine, threonine, valine, tryptophan, phenylalanine, methionine and L-selenomethionine, It will be evident that the amount of water, or liquid, added is that required to provide the proper concentration of the active components for the size of the container for the beverage, normally, such beverages, as with other drinks, come in a container holding at least about 8 fluid ounces of the beverage.

The composition can optionally include a sweetening agent. This sweetening agent comprises any complex carbohydrate or sweetening material conventionally used in rehydrating beverages and in their usual concentrations. Examples include, but are not limited to, maltodextrin, Neohesperidine dihydrochalcone, Lo Han Fruit extract, mixtures thereof, and the like. For dietetic beverages the known artificial sweeteners can be substituted for the agents. Since many who exercise do not want to ingest excess calories, the level of sugars used is kept low, preferably about 2 to 4% by weight of the beverage. However, there are often exercise related needs for the ingestion of greater levels of carbohydrates, especially in the recovery from long duration exercise where carbohydrate (glucose) is needed to replace muscle glycogen.

The composition can also include herbal extracts. Suitable herbal extracts include, but are not limited to, curcumin, boswellin, ashwagandha, ginkgo biloba, capsaicin and aconitine.

The beverage of the present invention may also contain citric acid, natural flavors, preservatives, natural colors and the like, in their usual proportions for their usual effects.

In a preferred embodiment the basic composition may comprises at least significant amounts of any of the following additional vitamins, electrolytes, minerals, nutrients, and antioxidant compounds listed in Table 1.

TABLE 1

| | |
|---|---|
| Sodium Chloride | 75–500 mg/L |
| Potassium Aspartate | 200–600 mg/L |
| Ester C | 60–400 mg/L |
| Calcium Citrate | 110–450 mg/L |
| Magnesium Aspartate | 40–200 mg/L |
| Thiamin | 0.5–5 mg/L |
| Riboflavin | 0.5–6 mg/L |
| Niacin | 0.5–8 mg/L |
| Pyridoxine HCL | 0.5–5 mg/L |
| Folic acid | 50–500 mcg/L |
| Cyanocobalamin | 1–20 mcg/L |
| Choline Dihydrogen Citrate | 20–500 mg/L |
| Malic acid | 50–300 mg/L |
| α-Tocopherol acetate | 2–50 IU/L |
| Inositol | 2–10 mg/L |
| PABA | 1–4 mg/L |
| Biotin | 50–300 mcg/L |
| Iron Glycinate | 0.5–10 mg/L |
| Potassium Phosphate | 100–900 mg/L |
| Zinc monomethionine aspartate | 10–100 mcg/L |
| Cooper Sebacate | 10–100 mcg/L |
| Manganese (as amino acid chelate) | 100–600 mg/L |
| Molybdenum (as amino acid chelate) | 2–30 mcg/L |
| Vanadium Chelavite | 3–30 mcg/L |
| Selenium (as amino acid chelate) | 5–50 mcg/L |
| Chromate GTF | 10–100 mcg/L |
| Boron (as amino acid chelate) | 3–50 mg/L |
| Betaine Citrate | 15–100 mg/L |
| L-glutamine | 100–900 mg/L |
| L-arginine | 100–900 mg/L |
| Branched Chain Amino-Acids | 250–2,000 mg/L |
| Coenzyme Q10 | 1 and 100 mg/L |
| OPC (95%) | 2–100 mg/L |
| Bioperine | 2–50 mg/L |

The products within the scope of this invention may take a variety of forms. For instance, the product may be manufactured and sold as a ready-to-drink beverage for direct consumption by a subject. The present invention may be prepared in concentrate or powder form to be reconstituted for use by the subject by the addition of water or any other appropriate liquid. Such reconstitution is made with the requisite amounts of water/liquid to ensure that the beverage to be consumed contains the active components in the proportions previously noted. In another embodiment the composition may be solubilized in water/liquid and then brought to a frozen state, so as to provide-for example—flavored ices on sticks, like the ones known under the commercial name or trade mark "Popsicle".

The present invention may be prepared by simply admixing the ingredients and packaging them in the conventional aseptic apparatus used for such purposes. Additionally, the solution, made up in reverse osmosis filtered water, may be combined with a small amount of a non glucose carbohydrate, such as fructose or sorbitol, to give it a pleasant sweet taste, with a calorie load not exceeding 120 kcal/liter, and flavored with any choice of fruit extract and/or aroma, such as orange, lemon, strawberry or others. The resulting beverage is preserved by pasteurization or sterilization and is intended for an average intake in conditions of environmental heat in amounts up to 2 liters/day.

In addition, the present invention may be prepared as a dry powder mixture. The dry powder mixture is combined with a support for dispersion in water/liquid, such as maltodextrin, with a non-glucose sweet taste base, such as neohesperidine dihydrochalcone, at a level so as not to exceed 120 kcal/L, when reconstituted, and possibly flavored with fruit extracts or aromas, such as orange, lemon, strawberry, or others. One dose is intended for dissolution in 591 ml drinking water/liquid (one standard sports bottle). The concentrations are merely indicative, and more concentrated drinks may be prepared on the same formula basis.

The above powder mix may be added to a suitable support for tablet compression, with good organoleptic properties, such as sorbitol and magnesium stearate. The mass is possibly edulcorated with a known natural sweetener such as Neohesperidine dihydrochalcone and the total energy content should not exceed 120 kcal in the average daily intake. The product may be flavored with any choice of fruit or other flavors, such as orange, lemon, menthol, eucaplytol, or the like. The compressed tablets (or equivalent solid forms with the same composition) are intended for an average daily intake of between 5 and 10 tablets.

The uses of the instant invention are largely evident from the foregoing description. For enhanced rehydration at rest, during exercise, and after exercise/dehydration, an average human need only ingest a beverage of the instant invention described above containing the active components thereof. It will be evident that the volume and rate of beverage needed to be ingested increases with the risk for dehydration. As is known, the amount ingested is related to the fluid volume needed to maintain normal body weight. This is highly individual and may require ingestion of between 8 and 24 fluid ounces of the beverage every hour during the dehydration stress. Also, when concerned with rehydration it has been more effective to ingest a volume of beverage about 1.5 times the weight loss from dehydration rather than the usual ingestion of a fluid volume equal to the weight loss from dehydration.

The above compositions are intended to give relief in conditions of sweating due to environmental heat and/or sunshine, when profuse sweating may be induced without significant physical exercise. While the composition is not intended to be a pharmaceutical composition to treat diseases induced by excessive exposure to heat or sun, the intake of the composition as described will help prevent negative consequences of heat-induced ion disturbances, without affecting the physiological thirst mechanism, and will assist in protecting from environmental heat-induced systemic effects (fatigue, exhaustion, muscle cramps, etc.). Inadvertent loss of electrolytes is common, especially in hot and dry climates (desert areas), where profuse sweating is not perceived, due to instantaneous evaporation from the skin. The regular intake of a product based on the present invention will support the body in coping with the negative effects of the heat stress.

An athlete engaged in strenuous activity requires a ready source of energy for endurance, and replacement of both body fluids and essential salts lost through perspiration. Drinking water alone will not replace the vital nutrients and will also cause stomach cramps. During athletic competition, other strenuous physical activity, and other periods of dehydration, the individual may replace lost body fluids and essential salts while sustaining a high level of energy through consumption of the beverage of the present invention.

Chronically ill patients or patients who rely on others to care for them may lose more fluid than they consume. Body physiology in elderly people, especially in those where some level of cardiocirculatory impairment is present, is far less able to cope with the negative effects of heat stress, than in young adults. Food and drinking habits may be inappropriate to cope with the changed requirements of the body in response to heat. Regular use of the present composition in these people will assist in maintaining better levels of adaptive responses to heat.

Additionally, various illnesses and surgical operations often cause a state of hypohydration. Thus, fluid replacement is essential during illness and during postoperative recovery periods. The present invention is beneficial for patients who exhibit dehydration symptoms including, but not limited to, those patients suffering from fever, severe diarrhea or vomiting, gastrointestinal disorders, cardiovascular disorders, xerostomia, and chronic illnesses, such as cancer. The present invention, while not being a medical treatment of these disorders, may better assist to re-establish balance of electrolytes and fluid replacement.

EXAMPLES

To illustrate the nature of the present invention, examples are given of a number of beverages. To those versed in the art, they will serve to demonstrate the type of flexibility possible with the use of the present invention. The examples are by no means considered a restriction or limitation of the present invention.

The instant compositions may be manufactured and sold as a ready-to-drink beverage for direct consumption by the consumer. The instant compositions may also be prepared in concentrate or powder form to be reconstituted by the user by the addition of water/liquid. Such reconstitution is made with the requisite amounts of water/liquid to ensure that the beverage to be consumed contains the active components in the proportions previously noted.

Examples 1–6

The compositions of the claimed invention are suitable for a variety of needs and individuals. Table 2 lists the ingredient ranges for examples of these uses such as sports activity, women, industrial activity, animals, and pediatric use. Example 2 is particularly suited for individuals who do sports activities; Example 3 is particularly suited for women; example 4 is particularly suited for individuals who work such as industrial activity; example 5 is particularly suited for animals; example 6 is particularly suited for pediatric usage.

TABLE 2

|  | Example 1 | Example 2 | Example 3 | Example 4 | Example 5 | Example 6 |
| --- | --- | --- | --- | --- | --- | --- |
| Maltodextrin (g/L) | 20–50 | 20–50 | 20–50 | 20–40 | 10–30 | 10–30 |
| Sodium Chloride (mg/L) | 75–500 | 75–150 | 75–150 | 150–300 | 75–150 | 75–50 |
| Potassium Aspartate (mg/L) | 200–600 | 200–300 | 200–300 | 300–600 | 200–300 | 200–300 |
| Ester C (mg/L) | 60–400 | 60–120 | 60–120 | 80–120 | 60–120 | 30–50 |

TABLE 2-continued

|  | Example 1 | Example 2 | Example 3 | Example 4 | Example 5 | Example 6 |
|---|---|---|---|---|---|---|
| Calcium Citrate (mg/L) | 110–450 | 110–160 | 200–300 | 110–160 | 110–160 | 110–160 |
| Magnesium Aspartate (mg/L) | 40–200 | 40–80 | 40–80 | 50–90 | 40–80 | 40–80 |
| Thiamin (mg/L) | 0.5–5 | 1–2 | 1–2 | 1–2 | 0.5–2 | 0.5–2 |
| Riboflavin (mg/L) | 0.5–6 | 1–3 | 1–3 | 1–3 | 0.5–3 | 0.5–3 |
| Niacin (mg/L) | 0.5–8 | 2–5 | 2–5 | 2–5 | 1–3 | 0.5–4 |
| Pyridoxine HCL (mg/L) | 0.5–5 | 1–2 | 1–2 | 1–2 | 0.5–2 | 0.5–2 |
| Folic acid (mcg/L) | 50–500 | 100–150 | 200–250 | 100–150 | 50–100 | 50–100 |
| Cyanocobalamin (mcg/L) | 1–20 | 2–6 | 2–6 | 2–6 | 1–3 | 1–5 |
| Choline Dihydrogen Citrate (mg/L) | 20–500 | 50–150 | 50–150 | 50–150 | 50–150 | 20–100 |
| Malic acid (mg/L) | 50–300 | 50–100 | 50–100 | 50–100 | 50–100 | 50–100 |
| a–Tocopherol acetate (IU/L) | 2–50 | 5–15 | 10–20 | 5–15 | 15–30 | 2–10 |
| Inositol (mg/L) | 2–10 | 3–6 | 3–6 | 3–6 | 2–4 | 2–4 |
| PABA (mg/L) | 1–4 | 1–2 | 1–2 | 1–2 | 1–2 | 1–2 |
| Biotin (mcg/L) | 50–300 | 100–200 | 100–200 | 100–200 | 50–100 | 50–100 |
| Iron Glycinate (mg/L) | 0.5–10 | 1–5 | 1–3 | 1–5 | 0.5–1 | 1–3 |
| Potassium Phosphate (mg/L) | 100–900 | 200–400 | 200–400 | 200–400 | 200–400 | 100–200 |
| Zinc monomethionine aspartate (mcg/L) | 10–100 | 20–35 | 20–35 | 20–35 | 10–20 | 10–20 |
| Cooper Sebacate (mcg/L) | 10–100 | 20–40 | 20–40 | 20–40 | 10–20 | 10–30 |
| Manganese (amino acid chelate) (mg/L) | 100–600 | 200–300 | 200–300 | 200–300 | 100–300 | 100–200 |
| Molybdenum (amino acid chelate) (mcg/L) | 2–30 | 5–10 | 5–10 | 5–10 | 2–5 | 2–8 |
| Vanadium Chelavite (mcg/L) | 3–30 | 5–10 | 5–10 | 5–10 | 5–10 | 3–6 |
| Selenium (amino acid chelate) (mcg/L) | 5–50 | 10–20 | 10–20 | 10–20 | 5–10 | 5–10 |
| Chromate GTF (mcg/L) | 10–100 | 10–20 | 10–20 | 10–20 | 10–20 | 10–20 |
| Boron (amino acid chelate) (mg/L) | 3–50 | 5–20 | 5–20 | 5–20 | 3–10 | 5–10 |
| Betaine Citrate (mg/L) | 15–100 | 15–40 | 15–40 | 15–40 | 15–40 | 15–40 |
| L-glutamine (mg/L) | 100–900 | 200–300 | 200–300 | 200–300 | 100–200 | 100–200 |
| L-arginine (mg/L) | 100–900 | 200–300 | 200–300 | 200–300 | 100–200 | 100–200 |
| Branched Chain Amino-Acids (mg/L) | 250–2,000 | 750–1,000 | 750–1,000 | 750–1,000 | 250–500 | 250–750 |
| Coenzyme Q10 (mg/L) | 1–100 | 5–20 | 5–20 | 5–20 | 1–5 | 2–5 |
| OPC (95%) | 2–100 | 5–20 | 5–20 | 5–20 | 5–10 | 2–10 |
| Bioperine (mg/L) | 2–50 | 2–10 | 2–10 | 2–10 | 2–10 | 2–10 |

Examples 7

A lemon/lime or other natural fruit flavored beverage was made which contained, for each 11 fluid ounces, the following:

| 1 WT. | |
|---|---|
| Maltodextrin | 11 grams |
| Sodium | 60 milligrams |
| Potassium | 121 milligrams |
| Ester-C (Vit. C) | 55 milligrams |
| Water | Balance |
| Betaine | 16.5 milligrams |
| Piperine | 1.1 milligrams |

The sodium was added in the form of a mixture of citrate, benzoate, and chloride salts and the potassium in the form of citrate and sorbate salts. The beverage also contained citric acid, natural flavors, and natural colors for their usual purpose and in the amount sufficient to give the beverage a lemon/lime-like flavor and appearance. Preferably, the potassium and all of the other minerals besides sodium are chelated.

The beverage was prepared by simply admixing the ingredients and packaging them in the conventional aseptic apparatus used for such purposes.

Examples 8

The beverage of Example 8 is made, except that in place of a portion of one of the potassium salts used therein, there was substituted potassium glycerophosphate in an amount to maintain the amount of potassium, in between 4 to 4.5 mEq/L, as set forth in Example 8. It is found that this further amount of glycerol is delayed in reaching the blood stream and, hence, the desired rehydrating effects of glycerol are extended for a longer period of time as compared to simply initially ingesting the same total amount of glycerol, as glycerol, initially. Thus, in the beverage of Example 8, the level of total glycerol (glycerol plus glycerol in the potassium glycerophosphate) can be increased to 17 grams (7.1% by weight).

While the invention has now been described in terms of a preferred embodiment of compositional ranges, the skilled artisan will appreciate the various substitutions, modifications, changes, and omissions may be made without departing from the spirit thereof.

What is claimed is:

1. A composition useful as a hydrating beverage, comprising at least one complex carbohydrate, at least one chelated electrolyte selected from the group of potassium aspartate or magnesium aspartate, betaine, and piperine.

2. The composition of claim 1 wherein betaine is from 15 to about 100 mg/L.

3. The composition of claim 1, further comprising an antioxidant.

4. The composition of claim 3, wherein the antioxidant comprises at least one of vitamin Ester-C, vitamin E, selenium, coenzyme Q 10, pycnogenol, L-glutathione, superoxide dismutase, bioflavonoids, pine bark grape seed complex, selenium, zinc, garlic or mixtures thereof.

5. The composition of claim 1, further comprising sodium.

6. The composition of claim 5, wherein the sodium comprises at least one of sodium chloride, sodium citrate, sodium bezoate or mixtures thereof.

7. The composition of claim 1, further comprising a sweetening agent.

8. The composition of claim 7, wherein the sweetening agent comprises at least one of maltodextrin, Neohesperiding dihydrochalcone, Lo Han Fruit extract, sucralose, trehalose or mixtures thereof.

9. The composition of claim 8, wherein the level of sweeteners used is about 2% to 4% by weight of the beverage.

10. The composition of claim 1, wherein said piperine is at least one of synthetically made piperine extract from black pepper or extract from piper longum.

11. The composition of claim 1, further comprising herbal extracts.

12. The composition of claim 11, wherein said herbal extracts comprises at least one of curcumin, boswellin, ashwagandha, ginkgo biloba, capsaicin, aconitine or mixtures thereof.

13. The composition of claim 1, further comprising vitamins, minerals and amino acids.

14. The composition of claim 13, wherein the vitamins comprise at least one of vitamin B1, vitamin B2, niacinamide, vitamin B6, vitamin B12, folic acid, vitamin C, vitamin E or mixtures thereof.

15. The composition of claim 13, wherein the amino acids comprise at least one of lysine, isoleucine, leucine, threonine, valine, tryptophan, phenylalanine, methionine, L-selenomethionine or mixtures thereof.

16. The composition of claim 13, wherein the minerals comprise at least one of calcium, iron, zinc, vanadium, selenium, chromium, boron, potassium, manganese, copper, magnesium or mixtures thereof.

17. The composition of claim 1, further comprising malic acid and citric acid.

18. The composition of claim 1, further comprising at least one natural flavor, natural color, or mixtures thereof.

19. The composition of claim 1, further comprising a preservative.

20. The composition of claim 1 wherein said beverage is in carbonated form.

21. The composition of claim 1 which is in a concentrate or powder form.

22. The composition of claim 1 solubilized in liquid and brought to a frozen state.

23. The composition of claim 1 prepared as a compressed solid form.

24. A process for the manufacture of a liquid composition to be used as a rebydration drink, wherein the components set forth in claim 1 are mixed, the resulting mixture being dissolved in a quantity of liquid at least sufficient to provide a solution wherein the components of claim 1 are substantially dissolved to provide a liquid composition ready for consumption by drinking.

25. A method of reducing one or more symptoms of dehydration of a human body by administration to a subject of an effective amount of a composition as claimed in claim 1.

* * * * *